United States Patent [19]

Braden

[11] Patent Number: 4,866,853

[45] Date of Patent: Sep. 19, 1989

[54] SYSTEM FOR DETERMINING ANGLES FOR CABINET TOPS

[76] Inventor: Roger J. Braden, 2105 N. Tropical Trail, Merritt Island, Fla. 32953

[21] Appl. No.: 169,847

[22] Filed: Mar. 21, 1988

[51] Int. Cl.$^4$ ............................................. B43L 7/06
[52] U.S. Cl. ...................................... 33/465; 33/471
[58] Field of Search ............... 33/613, 640, 465, 455, 33/471

[56] References Cited

U.S. PATENT DOCUMENTS

| | | | |
|---|---|---|---|
| 2,719,548 | 10/1955 | Mitchell | 33/465 X |
| 2,899,750 | 8/1959 | Becroft | 33/465 |
| 4,562,649 | 1/1986 | Ciauarella | 33/465 X |

*Primary Examiner*—Harry N. Haroian
*Attorney, Agent, or Firm*—James H. Beusse

[57] ABSTRACT

A system and method for determining cutting lines for cabinet top joinery without measurement of angles apparatus for apparatus for positioning against walls between which a cabinet top is to be installed and a transfer device for establishing a distance between a selected points on the apparatus. A saw guide incorporates a linkage arrangement adapted for mating with the transfer device so as to establish a cutting angle which bisects the angle of intersection of the walls. Another mechanism is provided to automatically determine offset cutting angles using only the transfer device.

3 Claims, 1 Drawing Sheet

SYSTEM FOR DETERMINING ANGLES FOR CABINET TOPS

BACKGROUND OF THE INVENTION

This invention relates to geometrical instruments and, more particularly, to a method and apparatus for transferring non-perpendicular angles in building construction to corresponding cutting angles.

The method and apparatus of the present invention is particularly adapted for use in establishing cutting angles for cabinet tops. For example, in many modern style kitchens, it has become common to design structures which have obtuse angles rather than perpendicular walls. Cabinet tops for such kitchens are required to provide a continuous surface extending through such obtuse angles corners. Computation of the proper cutting angles to form joints for such tops is difficult and often beyond the capability of many cabinet installers. Accordingly, it is desirable to provide a method and apparatus for determining such angles with a minimum of skill.

SUMMARY OF THE INVENTION

The above and other disadvantages are overcome in an apparatus for determining cutting angles for cabinet tops traversing a corner in which first and second pivoting guides, each comprising a substantially straight elongated member having at least one end adapted to pivotably attach to one end of the other of the guides is provided for determining angular orientation of walls. Each of the guides has a connection point located a predetermined distance from the at least one end. An adjustable measurement transfer means including first and second relatively adjustable elements adapted for mating engagement with the connection point of the two guides is provided for determining the displacement between the guides. The adjustable elements have means for at least temporarily fixing the position of the elements so that the spacing between the connection points on the two guides is established by the position of the elements.

In one embodiment, there is provided a saw guide which includes a parallelogram linkage and a first bar extending in a direction parallel to a saw cutting direction. A second bar is pivotably coupled to the first bar and oriented in a position for urging a top into a cutting position. A second bar forms one arm of the parallelogram linkage. The parallelogram linkage is further formed by third, fourth and fifth bars which are pivotably connected to the first and second bars with at least one pivotable point between the remaining bars being coupled for slidable positioning on the first bar whereby the angular orientation of the second bar with respect to the first bar is varied by sliding of the at least one pivotable point. The two remaining pivotable points of the parallelogram linkage include apertures adapted for receiving the relatively adjustable elements on the transfer measurement apparatus. When the at least one pivotable point is adjusted such that the adjustable elements mate with the two apertures in the remaining pivotable points, the angle defined by the first and second bars establishes a proper cutting angle for the cabinet top. This arrangement provides for an ability to cut a cabinet top at a proper angle bisecting the angle defined by mating walls without the necessity of actually measuring the angle or computing the angle bisecting the walls.

In another embodiment there is provided an apparatus for actually determining cutting angles or for determining cutting set back dimensions using the measurement transfer device. In this embodiment, first and second sheets having pivotable connection at corresponding corners are provided with at least one of the sheets having a plurality of scales formed on its surface. The other of the sheets has a plurality of lines corresponding to the scales such that the overlapping intersection of the scales and the lines defines set back dimensions. The sheets have apertures corresponding to the connection points on the first and second pivoting guides so that the adjustable elements can be inserted in the apertures to properly position the angular orientation of the two sheets with respect to each other. When the measurement transfer device is positioned so as to lock the two sheets in locked position, the intersection of the lines on one sheet with the linear scales on the other sheet provide an offset cutting dimension which will allow the cabinet top to be cut so that the joining angle between two tops traversing a corner will bisect a corner.

BRIEF DESCRIPTION OF THE DRAWINGS

For a better understanding of the present invention, reference may be had to the folowing detailed description taken in conjunction with the accompanying drawings in which.

DETAILED DESCRIPTION OF THE PREFERRED EMBODIMENT

Figure 1:
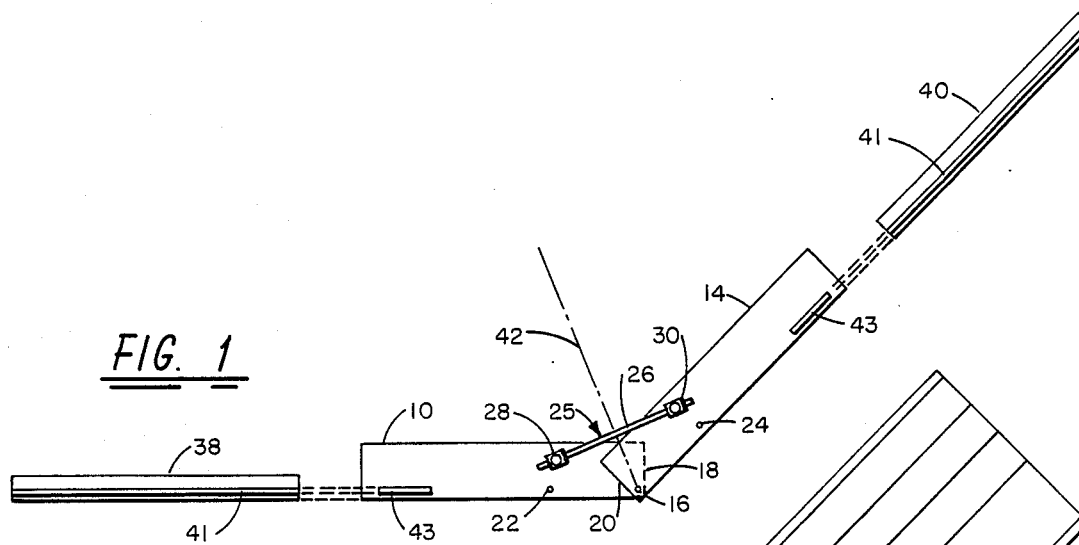
FIG. 1 is a planar illustration of the angle gage comprising the first and second pivoting guides.
Figure 2:
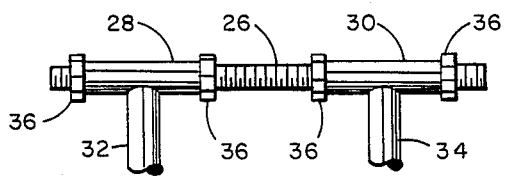
FIG. 2 is a planar view of the adjustable measurement transfer means shown in FIG. 1.

Referring now to FIG. 1, there is shown a first part of the apparatus for determining cutting angles for cabinet tops. The apparatus includes first and second pivoting guides 10 and 14 each comprising a substantially straight elongated member which may be shaped as a rectangular flat plate-like member. The members 10 and 14 are each provided with apertures 16 at corresponding corners which enable the members to be pivotably attached to each other at at least one end of the members. The attachment may be by means of a pin passing through the apertures 16. At predetermined distances from the ends 18 and 20 of the respective ones of the members 10 and 14 there are provided connection points 22 and 24 which may take the form of additional apertures drilled or formed in the plate-like members 10 and 14. The two members 10 and 14 can be held in fixed position by an adjustable measurement transfer means 25 illustrated as a threaded rod 26 having relatively adjustable elements 28 and 30 threadedly connected to each end thereof. FIG. 2 illustrates in more detail the adjustable measurement transfer means 25 and shows two depending pins 32 and 34 dimensioned to fit within the apertures 22 and 24 in the members 10 and 14. The elements 28 and 30 can be moved along the threaded rod 26 by loosening the restraining nuts 36. Once the two members 10 and 14 have been positioned in an area in which a cabinet is to be installed and held firmly against a wall surface, the rod 26 can be positioned with the members 28 and 20 arranged so that the pins 32 and 34 can be inserted in the apertures 22 and 24. The nuts 36 are then tightened to hold the elements 28 and 30 in fixed position.

In some instances, the walls may be arranged such that the members 10 and 14 can not be abutted squarely against the wall surface. In such situations, additional extensions 38 and 40 may be attached to the members 10 and 14 to provide a longer bearing surface. In a preferred embodiment, the members 38 and 40 have key ways 41 which are adapted to mate precisely with keys 43 formed on the upper surfaces of members 10 and 14. The members 38 and 40 can then be slid onto the surfaces of members 10 and 14 and adjusted to any desired dimension. Once the angular orientation of members 10 and 14 has been established and the elements 28 and 30 locked in position on the threaded bar 26, the threaded bar 26 then operates as a transferable measuring device to enable cutting of cabinet tops so as to fit within the angle defined by the walls from which the measurement was derived. It will be appreciated that for two cabinet tops which are to be joined to traverse the angle defined by the two walls, the two tops should be cut at an angle which bisects the angle defined by the mating walls. This angle is indicated by the line 42. It will be appreciated from the view of FIG. 1 that the angle of line 42 is not directly measured by the apparatus shown in FIG. 1 since it is a bisector of the angle defined by the mating walls. In general, it has been required that the actual angle be measured and that trigometric functions be employed to determine the angle defined by the line 42. The present invention obviates this requirement for actual angle measurement while providing an apparatus that precisely defines the angle defined by line 42 for purposes of cutting cabinet tops or other members for insertion into angles defined by mating walls.

Figure 3:
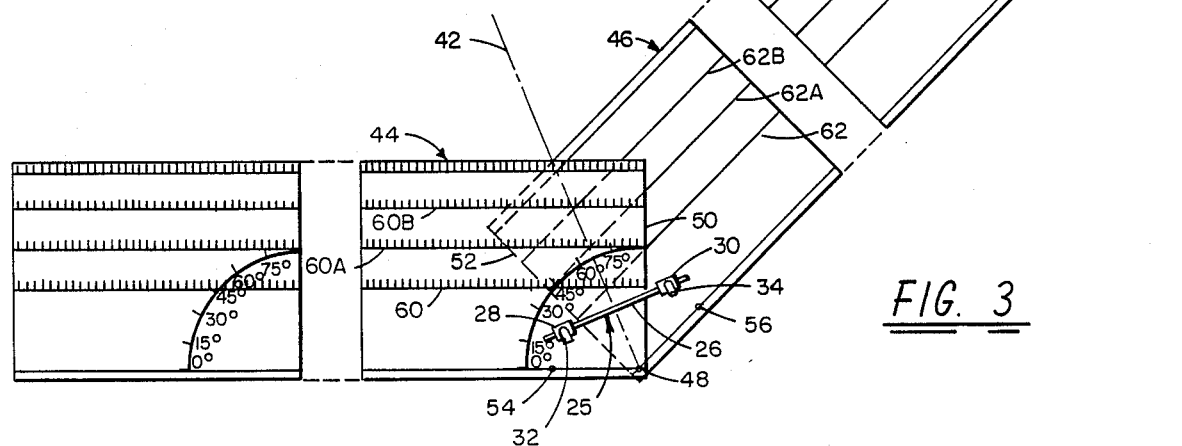
FIG. 3 is a planar view of a drafting aid in accordance with the present invention using the measurement transfer means.

Turning now to FIG. 3, there is shown one apparatus which enables the angle defined by the line 42 to be directly measured and alternatively to obtain a cutback dimension for a cabinet top without actually measuring the angles defined by the line 42. FIG. 3 illustrates a drafting aid comprising first and second flat sheets 44 and 46 having a pivotable connection at corresponding corners as indicated at point 48. A predetermined distance from ends 50 and 52 of the sheets 44 and 46 there are provided apertures 54 and 56 which correspond to the apertures 22 and 24 in the angle gage apparatus members 10 and 14. When a pin is inserted in the apertures 48 connecting the two sheets 44 and 46, the measurement transfer means 25 can be utilized to position the angular orientation of the two sheets 44 and 46 so that the actual angle at which a line 42 need be cut on a cabinet top can be determined. Note that the transfer means including the rod 46 and two elements 28 and 30 is positioned on the two sheets so that the pins 32 and 34 are inserted in the apertures 54 and 56. An angle gage is inscribed on the sheet 44 at 58 so that the angle at which the line 42 is to be cut with respect to the walls can be obtained by the intersection of the edge 52 of sheet 46 with the angle gage 58.

The sheet 44 is also provided with a plurality of scales representing offset dimensions from a line perpendicular to one of the walls so that the cabinet top may be cut by a measurement of an offset dimension rather than actual determination of an angle. For example, for a twelve inch wide cabinet top, the scale 60 provides set back dimension from a line perpendicular to one of the walls which enables an operator to measure a dimension from an edge of a cabinet top and cut from a back corner of the cabinet top to that offset dimension to thus directly form the proper angle aligning with the line 42 without having to actually determine the angle. Note that the offset dimension is not determined by the intersection of the edge 52 with the line 60 but by the intersection of the line 62 with the line 60. The line 62 corresponds to a cabinet top with the same width as that represented by line 60. Since each of the cabinet tops is desirably cut so as to follow the line 42, i.e., to bisect the corner angle, each top is cutback 22½ degrees rather than the illustrated 45 degrees. Different width tops provide slightly different offsets as is illustrated by the lines 60A, 60B, 62A and 62B. It should be noted that additional apertures may be provided in the sheets 44 and 46 and also in the members 10 and 14 for obtaining measurement for more acute angles.

Figure 4:
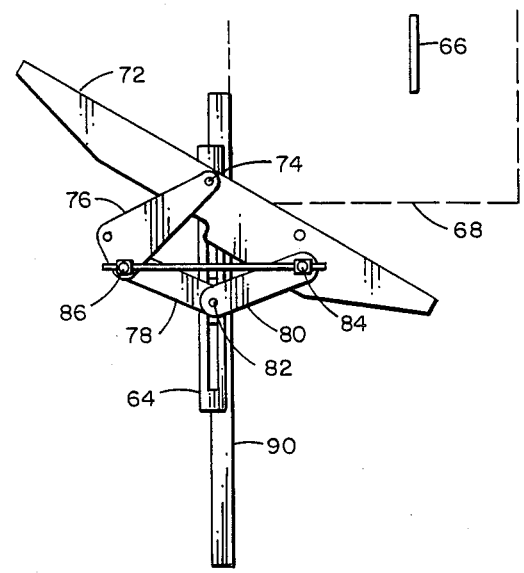
FIG. 4 is a saw guide which enables cutting of cabinet tops without angle measurement using the present invention.

Turning now to FIG. 4 there is shown a saw attachment or a guide arrangement including a parallelogram linkage which allows dimensions obtained from the guides 10 and 14 to be used directly for cutting of cabinet tops without having to actually measure or determine dimensions using the drafting guides of FIG. 3. The saw guide includes a first bar 64 which extends in a direction parallel to a saw cutting direction as is indicated by the position of a saw blade 66 on a table saw table 68. The bar 64 is provided with a slot extending over a relatively large dimension thereof for purposes which will become apparent. A second bar 72 is pivotably connected to the bar 64 at pivot point 74. The bar 72 is oriented in a position for urging a cabinet top into a cutting position for cutting with saw blade 66. The bar 72 forms one arm of the parallelogram linkage with the third, fourth and fifth arms being defined by bars 76, 78 and 80. The bar 76 is pivotably connected to pivot point 74 and also pivotably connected to bar 78. Bar 78 is additionally pivoted to bar 80 at a pivot point 82, which pivot point 82 is also slidably connected in the slot 70 of bar 64. The bar 80 is connected to pivot about point 82 and also is pivotably connected to bar 72 at point 84.

A cabinet to be cut is properly oriented with respect to the saw blade 66 by the angular orientation of bar 72. The angular orientation of bar 62 is controlled by the position of pivot point 82 in slot 70. This pivot point position can be controlled by the relative position of pivot point 84 and pivot point 86 at the junction of bars 76 and 78. At each of the pivot points 84 and 86, there is provided apertures for receiving the pins 32 and 34 on the transfer measurement device 25. Since the position of the elements 28 and 30 are fixed by the use of gaging means of FIG. 1 the position of pivot point 82 can be adjusted so that the pins 32 and 34 fit into the apertures at pivot points 84 and 86. When this position is achieved, the cabinet is angled so that the saw blade will effect a cut which will cause the end of the cabinet top to lie along the line 42. The apparatus of FIG. 4 therefore provides a saw guide which allows the cabinet top to be cut without having to determine any of the angular dimensions necessary to cut the top so that a joint is formed along the line 42. Thus, the apparatus of the present invention enables anyone having ordinary carpentry skills to accurately determine and cut cabinet tops or other members so as to form a joint which bisects an angle without the necessity of having any trigometric knowledge of the method of obtaining the proper cutting angles.

A support for the saw attachment is indicated at 90 and comprises a flat plate and angle which can be attached to table 68 for supporting the saw guide for motion toward blade 66.

While the invention has been described in what is presently considered a preferred embodiment, other modifications and variations of the system will become apparent to those having ordinary skill in the art. Accordingly, it is intended that the invention not be limited to the specific embodiment but be interpreted within the spirit and scope of the appended claims.

I claim:

1. Apparatus for determining cutting angles for cabinet tops traversing a corner comprising:

first and second pivoting guides, each guide comprising a substantially straight elongated member having at least one end adapted to pivotably attach to at least one end of the other of the guides and further having a connection point located a predetermined distance from the at least one end;

adjustable measurement transfer means including first and second relatively adjustable elements adapted for mating engagement with said connection point, said relatively adjustable elements having operatively associated therewith means for at least temporarily fixing the position of said elements whereby the spacing between said connection point on one of said guides and said connection point on another of said guides is established by the position of said elements;

a saw guide including a parallelogram linkage, said saw guide including a first bar extending in a direction parallel to a saw cutting direction, a second bar pivotably coupled to said first bar and oriented in a position for urging a top into a cutting position, said second bar forming one arm of said parallelogram linkage, third, fourth and fifth bars pivotably connected to said first and second bars so as to complete said parallelogram linkage, at least one pivotable point of said linkage being coupled for slidable positioning on said first bar whereby the angular orientation of said second bar with respect to said first bar is varied by sliding of said at least one pivotable point; and at least two fixturing points on said parallelogram linkage adapted for receiving said relatively adjustable elements when said at least one pivotable point is positioned such that the angle defined by said first and second bars establishes a proper cutting angle for the cabinet top.

2. Apparatus for determining cutting angles for cabinet tops traversing a corner comprising:

first and second pivoting guides, each guide comprising a substantially straight elongated member having at least one end adapted to pivotably attach to at least one end of the other of the guides and further having a connection point located a predetermined distance from the at least one end;

adjustable measurement transfer means including first and second relatively adjustable elements adapted for mating engagement with said connection point, said relatively adjustable elements having operatively associated therewith means for at least temporarily fixing the position of said elements whereby the spacing between said connection point on one of said guides and said connection point on another of said guides is established by the position of said elements; and a drafting aid comprising first and second flat sheets having a pivotable connection at corresponding corners thereof, at least one of said sheets having a plurality of linear scales formed on a surface thereof, each of said scales representing an offset dimension for cutting of a joining edge of a cabinet top; the other of said sheets having a corresponding plurality of lines each positioned to be a continuation of said scales when said sheets are abutting, each of said sheets including a fixturing point for receiving said adjustable elements, the intersection of said scales and said lines when said sheets are angularly pivoted such that said elements are fixed to said fixturing points defining a cutback dimension for cutting an edge of a cabinet top so that said edge bisects the angle of the corner traversed by the top.

3. A method for cutting cabinet tops such that abutting sections mate along lines bisecting a corner around which the tops are to be installed, the method employing a pivotable guide having arms joined at ends thereof and pivotable about the joined ends; a continuously adjustable measurement transfer device having at least two relatively movable elements adapted for releasable engagement with predeterminately located apertures in each of the pivotable arms; a saw guide having a pivotable bar for orienting a cabinet top in a position for cutting, the pivotable bar being attached by a pantograph to a sliding guide bar predeterminately oriented parallel to a cutting direction, the pantograph including apertures corresponding to the apertures in the pivotable guide whereby positioning of the spacing between the apertures in the pantograph is effective to angularly orient the pivotable bar; the method comprising the steps of:

inserting the movable elements of the continuously adjustable measurement transfer apertures into corresponding apertures in respective arms of the pivotable guide;

adjusting the transfer apertures until the arms of the guide are flush with mating walls of a corner to be bisected;

removing the transfer apparatus from the pivotable guide;

adjusting the saw guide until alignment holes in the pantograph are positioned for insertion of the movable elements of the transfer device;

inserting the movable elements of the transfer device into the aligned holes of the pantograph to lock the saw guide into a fixed position; and using the saw guide to saw cabinet tops at an angle bisecting the mating walls.

* * * * *